United States Patent Office 2,839,562
Patented June 17, 1958

2,839,562
DERIVATIVES OF AMINOSULFONIC ACID

Richard Wegler and Hans Kukenthal, Leverkusen, Germany, assignors to Farbenfabriken Bayer Aktiengesellschaft, Leverkusen, Germany, a corporation of Germany No Drawing. Application February 12, 1954
Serial No. 412,403

(Filed under Rule 47(a) and 35 U. S. C. 116)

Claims priority, application Germany February 13, 1953

8 Claims. (Cl. 260—456)

The present invention relates to new derivatives of aminosulfonic acid, more particularly it is concerned with N-disubstituted aminosulfonic acid arylesters and a process for their production.

In accordance with the present invention it has been found that N-disubstituted aminosulfonic acid arylesters are obtained in excellent yields by reacting N-disubstituted aminosulfonic acid halides with salts of phenols or naphthols. This reaction could not be foreseen since chlorosulfonic acid phenylester and sodium phenate do not yield sulfuric acid diphenylester but lead to the formation of diphenylether.

The reaction underlying the process of the invention may be represented by the following equation:

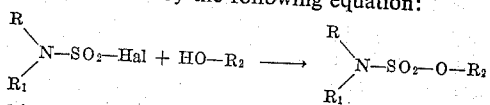

in which R and $R_1$ are alkyl, cycloalkyl, aryl or form a heterocyclic ring with N, and $R_2$ is an aromatic radical.

Suitable starting materials for the reaction are phenols and naphthols such as phenol, alkylphenols, halogenophenols, nitrophenols, α- and β-naphthols. These compounds are preferably used in the form of their alkali salts; likewise, the salts of the phenols and naphthols, respectively, with earth alkali metals or tertiary amines have proven satisfactory starting materials.

Among the N-disubstituted aminosulfohalides, which are suitable for the process of the invention, are the N-dialkyl-aminosulfochlorides, the N-dicycloalkylamino-sulfochlorides, the N-arylaminosulfochlorides. Aminosulfohalides of the mixed aliphatic-aromatic type, such as N-alkyl-aryl-aminosulfochlorides, may also be employed.

Although the reaction is exothermic it is advantageous to start the process at elevated temperatures, for example at 90° C., in order to secure a satisfactory reaction velocity. Solvents which are suitable for the process of the invention are inert organic liquids such as ether, chlorobenzene, toluene and dioxane. When using alcohols as the solvents, the yield is slightly reduced. If the reaction is carried out in an aqueous medium, the yield is still smaller.

The aminosulfonic derivatives obtained according to the invention are valuable insecticides. They are also active against spider mites. A powder containing 5–10% of phenylester or 4-chlorophenylester of dimethylaminosulfonic acid kills the grain weevil within 24 hours when applied in the proportion of 1:1000 (1 kg. of powder per 1000 kg. of grain).

A special advantage of these compounds is that they are physiologically harmless. When tested with mice they exhibit no toxicity up to 250 mg./kg.

The invention is further illustrated by the following examples without being restricted thereto.

Example 1

47 grams of dimethylaminosulfochloride are added dropwise at 100° C. with good stirring to 38.6 grams of the sodium salt of 4-chlorophenol suspended in 50 grams of xylene. A slightly exothermic reaction occurs. The reaction is completed by heating for an hour. After filtering off the sodium chloride, the xylene is removed by distillation and the residue fractionated in vacuo. Yield: 61 grams; B. P.: 121–123° C. at a pressure of 0.2 mm. Hg; M. P.: 46° C.

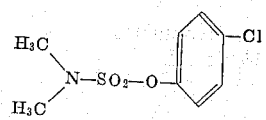

Example 2

39.4 grams of 2,4,6-trichlorophenol are converted into the sodium phenate by the addition of an appropriate quantity of sodium methylate and the alcohol is substantially removed by vacuum distillation. 200 grams of xylene are added and to the mixture there are added 32 grams of dimethylaminosulfochloride at 115–120° C. Reaction time: two hours. Yield: 56 grams; M. P. 115–117° C. (after crystallizing from alcohol).

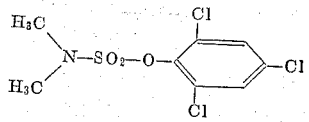

In the same manner the ester from the sodium salt of 4-nitrophenol and dimethylaminosulfochloride is obtained. M. P. 119–122° C.

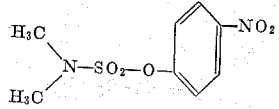

In analogous manner there are obtained the following dimethylaminosulfonic acid esters of: phenol,

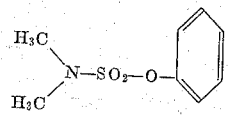

B. P.: 121–123° C. at a pressure of 0.5 mm. Hg; 2,4-dichlorophenol,

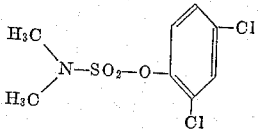

B. P.: 142–144° C. at a pressure of 0.3 mm. Hg; p-cresol,

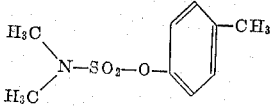

B. P.: 125–127° C. at a pressure of 0.3 mm. Hg; o-cresol,

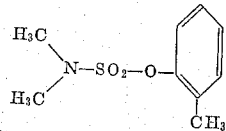

B. P.: 125–128° C. at a pressure of 0.5 mm. Hg; 2-methyl-4-chlorophenol,

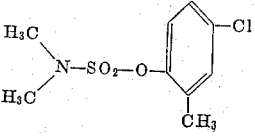

B. P.: 140–142° C. at a pressure of 0.4 mm. Hg; M. P.: 50° C.; α-naphthol,

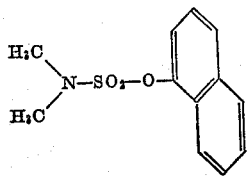

B. P.: 171–175° C. at a pressure of 0.2 mm. Hg; M. P.: 64–66° C.

Likewise there is obtained the 4-chlorphenylester of diethylaminosulfonic acid

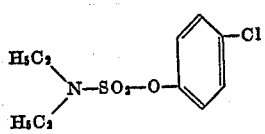

B. P.: 134–136° at a pressure of 0.6 mm. Hg.

We claim:
1. An aminosulfonic aryl ester having the formula

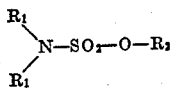

in which $R_1$ is an alkyl radical having from 1–4 carbon atoms, $R_2$ is a member selected from the group consisting of phenyl, halogen-substituted phenyl, nitro-substituted phenyl, lower alkyl-substituted phenyl and naphthyl.

2. An aminosulfonic aryl ester having the formula

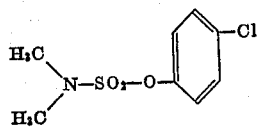

3. An aminosulfonic aryl ester having the formula

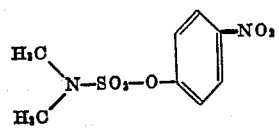

4. An aminosulfonic aryl ester having the formula

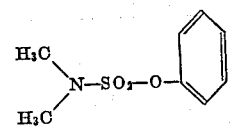

5. An aminosulfonic aryl ester having the formula

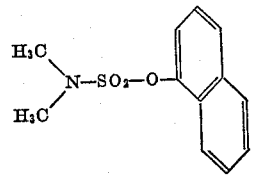

6. An aminosulfonic aryl ester having the formula

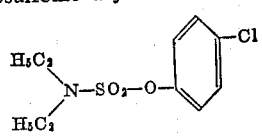

7. A process for the production of aminosulfonic acid aryl esters, which comprises reacting a N-di-lower alkyl-substituted aminosulfonic acid halide with a salt of a member selected from the group consisting of halogen-substituted phenols, nitro-substituted phenols, lower alkyl-substituted phenols and naphthol.

8. A process for the production of aminosulfonic aryl esters which comprises reacting N-dimethylamino-sulfochloride with the sodium salt of a phenol in the presence of xylene at a temperature within the range of 70–140° C., filtering off the sodium chloride formed in the reaction, distilling off the xylene and recovering from the residue an aminosulfonic arylester.

References Cited in the file of this patent

UNITED STATES PATENTS

| | | |
|---|---|---|
| 2,553,993 | Wuest | May 22, 1951 |
| 2,567,008 | Britton et al. | Sept. 4, 1951 |
| 2,721,875 | Dickert et al. | Oct. 25, 1955 |

FOREIGN PATENTS

| | | |
|---|---|---|
| 1,092,893 | France | Nov. 10, 1954 |

OTHER REFERENCES

Degering: "An Outline of Organic Nitrogen Compounds" (1945), page 484.